Jan. 13, 1931.   M. J. MARRINAN ET AL   1,788,924
ANIMAL HOLDING CRATE
Filed May 28, 1927   3 Sheets-Sheet 1

Inventors
Michael J. Marrinan
Martin J. Marrinan and
James W. Marrinan
By Bradbury & Cauwell,
Attorneys Jan. 13, 1931.  M. J. MARRINAN ET AL  1,788,924
ANIMAL HOLDING CRATE
Filed May 28, 1927  3 Sheets-Sheet 3

Inventor
Michael J. Marrinan
Martin J. Marrinan and
James W. Marrinan
By Bradbury & Caswell
Attorneys Patented Jan. 13, 1931

1,788,924

UNITED STATES PATENT OFFICE

MICHAEL J. MARRINAN, MARTIN J. MARRINAN, AND JAMES W. MARRINAN, OF ST. PAUL, MINNESOTA

ANIMAL-HOLDING CRATE

Application filed May 28, 1927. Serial No. 195,032.

Our invention relates to animal holding crates and has for its object to provide a device capable of firmly holding an animal while the same is being treated or operated upon, as is now frequent practice in the manufacture of serums and similar medical preparations.

An object of the invention resides in providing a framework consisting of a pair of spaced frame members connected together at their upper portions by means of tie members, said frame members having an abutment extending across the same near their upper portions, and in further providing a cradle disposed between said frame members and adapted to be moved toward or from said abutment.

A still further object of the invention resides in providing said frame members with intermediate rails to which said abutment is attached, in pivoting to said rails pairs of levers, said levers having outwardly and inwardly extending arms, in attaching to said cradle near the corners thereof brackets and in connecting said brackets to the outwardly extending arms of said levers through suitable hangers.

An additional object of the invention resides in pivoting to the upper portions of said frame members a yoke having a leg disposed substantially in the plane of each of said pairs of levers, and in connecting each of said legs of said yoke to the inwardly extending arms of said levers by means of a pair of links, whereby all of said levers are simultaneously operated to raise and lower said cradle from the four corners thereof.

A feature of the invention resides in providing a locking mechanism for holding said yoke in locked position.

Another object of the invention resides in providing the end of said cradle with a slot and a plurality of kerfs adapted to receive a chain for holding the head of the animal from movement.

A still further object of the invention resides in detachably mounting upon the end of said cradle a guard adapted to move with said cradle.

With the foregoing and other objects in view, which will appear in the following description, the invention resides in the novel combination and arrangement of parts and in the details of construction hereinafter described and claimed.

In the handling of animals in the manufacture of serums and similar medical preparations by means of the ordinary crates now available for the purpose, considerable danger arises with crates employing windlasses and similar structures for raising and lowering the cradle of the crate when the animal is being released from the crate, due to the operator being unable to control the cranks of the windlasses and receiving injuries thereby. Our invention overcomes this disadvantage by producing a simple and effective lever system for raising and lowering the crate, whereby the same may be accomplished in a simple and expeditious manner by a single operation of the operating lever.

Figure 1:
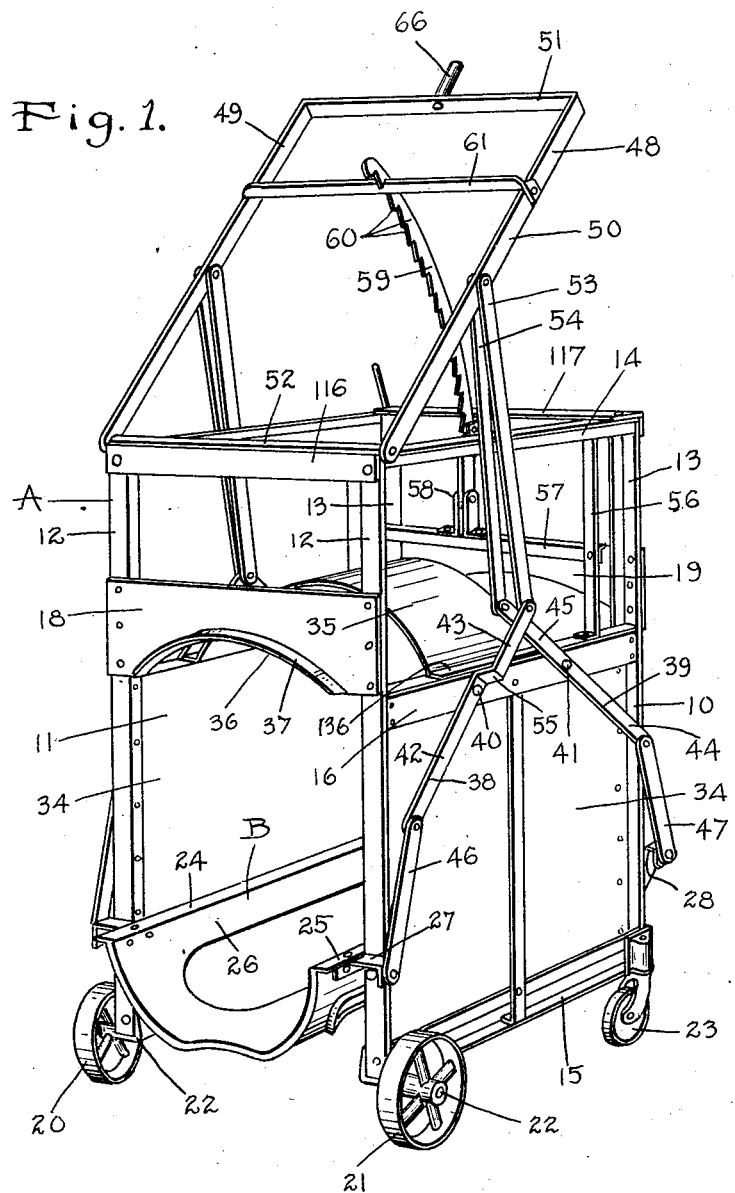
Fig. 1 is a perspective view of our invention illustrating the cradle in lowered position ready to receive an animal to be operated upon.

Our improved animal holding crate comprises primarily a framework A which consists of two spaced frame members 10 and 11 constructed as best shown in Fig. 1. Each of these frame members consists of two uprights 12 and 13 connected together by upper and lower rails 14 and 15 and intermediate rails 16 disposed nearer the upper rails 14 than the lower rails. The two frame members 11 and 12 are connected together at the upper portions of the uprights 12 and 13 by means of transverse or cross rails 116 and 117 and by means of two tie plates 18 and 19 disposed somewhat below said cross rails and having the lower edges positioned at the upper portions of the rails 16. If desired, the portion of the frame members 10 and 11 below the rails 16 may be lined with a suitable sheet metal lining 34 so as to form a smooth enclosure within the frame members between which the animal may be readily directed in placing the same within the crate.

The framework A is supported on two stationary wheels 20 and 21 which are journaled on trunnions 22 secured to the lower ends of the uprights 12 together with two caster wheels 23 mounted on the lower ends of the frame members 13. By means of this arrangement the entire crate may be readily moved about to facilitate the use of the same.

Figure 3:
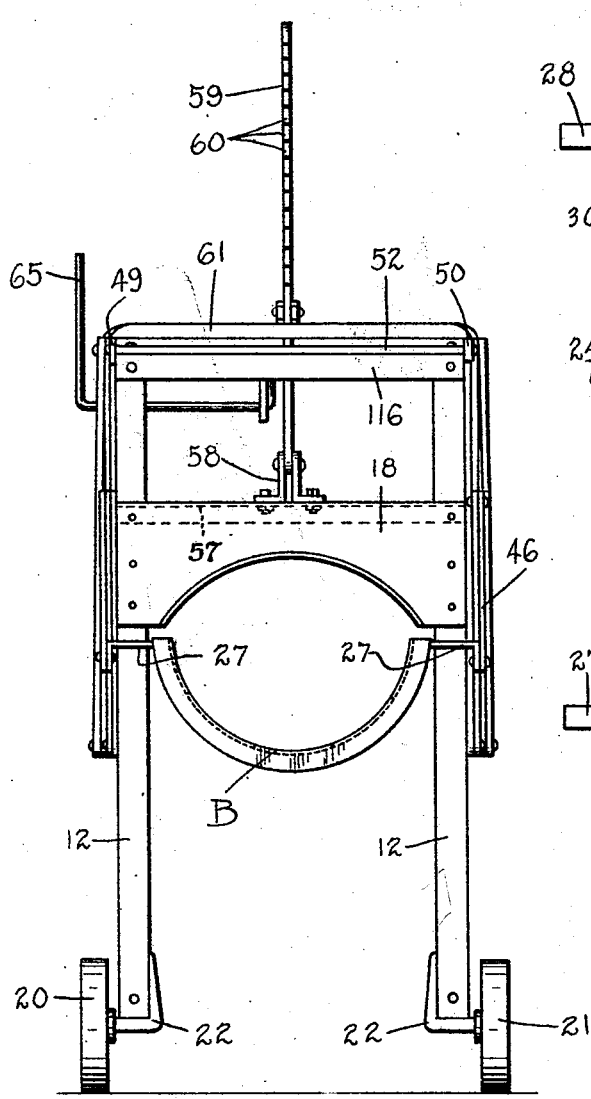
Fig. 3 is an end view of the device as illustrated in Fig. 2.
Figure 4:
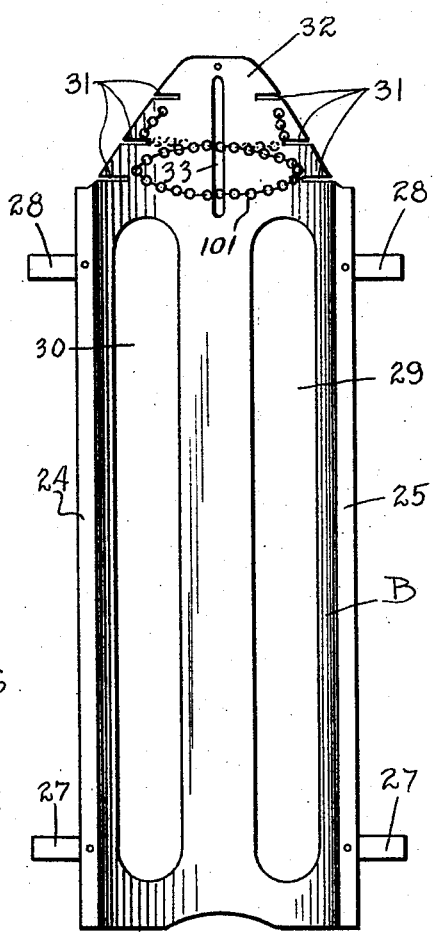
Fig. 4 is a plan view of the cradle of our invention detached from the framework thereof.

As will be noted in Figs. 1 and 3 the portion of the framework A beneath the tie plates 18 and 19 is fully open. Within this space is disposed a cradle B which consists of two longitudinal beams 24 and 25 supporting a body portion 26 preferably constructed of sheet metal and of arcuate formation to substantially fit about the belly of the animal to be handled by the device. This cradle is provided at the four corners thereof with brackets 27 and 28 by means of which the cradle is carried in a manner to be presently described. The body portion 26 of cradle B is formed with two longitudinal openings 29 and 30 which extend substantially throughout the length of the cradle and are adapted to allow the feet of the animal to project therethrough during the use of the device. In addition, the cradle B is formed with kerfs 31 along the edges of the front portion 32 thereof, together with a longitudinal slot 33 by means of which a suitable chain 101 may be attached to the cradle for holding the head of the animal from movement.

Co-operating with the cradle B we employ an arcuate abutment 35, which abutment may be constructed of sheet metal and is formed along its edges with flanges 136 by means of which the same can be attached to the intermediate rails 16 of frame members 10 and 11. This abutment is disposed between the tie plates 18 and 19 and is adapted to engage the back of the animal when the cradle B is raised as will be presently described, so as to hold the animal firmly within the crate. To further facilitate the holding of the animal, the tie plates 18 and 19 are curved along their lower edges as indicated at 36 and formed with outwardly extending flanges 37 along said curved portions to stiffen the same and to assist in engaging the back of the animal when the animal is held within the crate.

For raising and lowering the cradle B we employ two sets of levers which are pivoted to the respective frame members 10 and 11 and connected to the four brackets 27 and 28 of cradle B. These levers being the same for each frame member, those only attached to frame member 10 will be described in detail. These levers are indicated at 38 and 39 and are pivoted at 40 and 41 to the intermediate rail 16 of said frame member. The pivots 40 and 41 are spaced from one another in symmetrically disposed relation relative to the center of the said rail. The lever 38 is formed with an outwardly extending arm 42 and an inwardly extending arm 43, while the lever 39 is formed with an outwardly extending arm 44 and an inwardly extending arm 45. These arms are of such a length that the ends of the arms 43 and 45 move substantially along the center of the device when the said levers are operated and the ends of the arms 42 and 44 move substantially along the uprights 12 and 13. To the ends of the arms 42 and 44 are pivoted two hangers 46 and 47 which in turn are pivoted to the brackets 27 and 28 of the cradle B. It can be readily seen that when the two sets of levers 38 and 39 are simultaneously operated, that the cradle B is raised or lowered from the four corners thereof, thereby providing a rigid support for the same.

Figure 2:
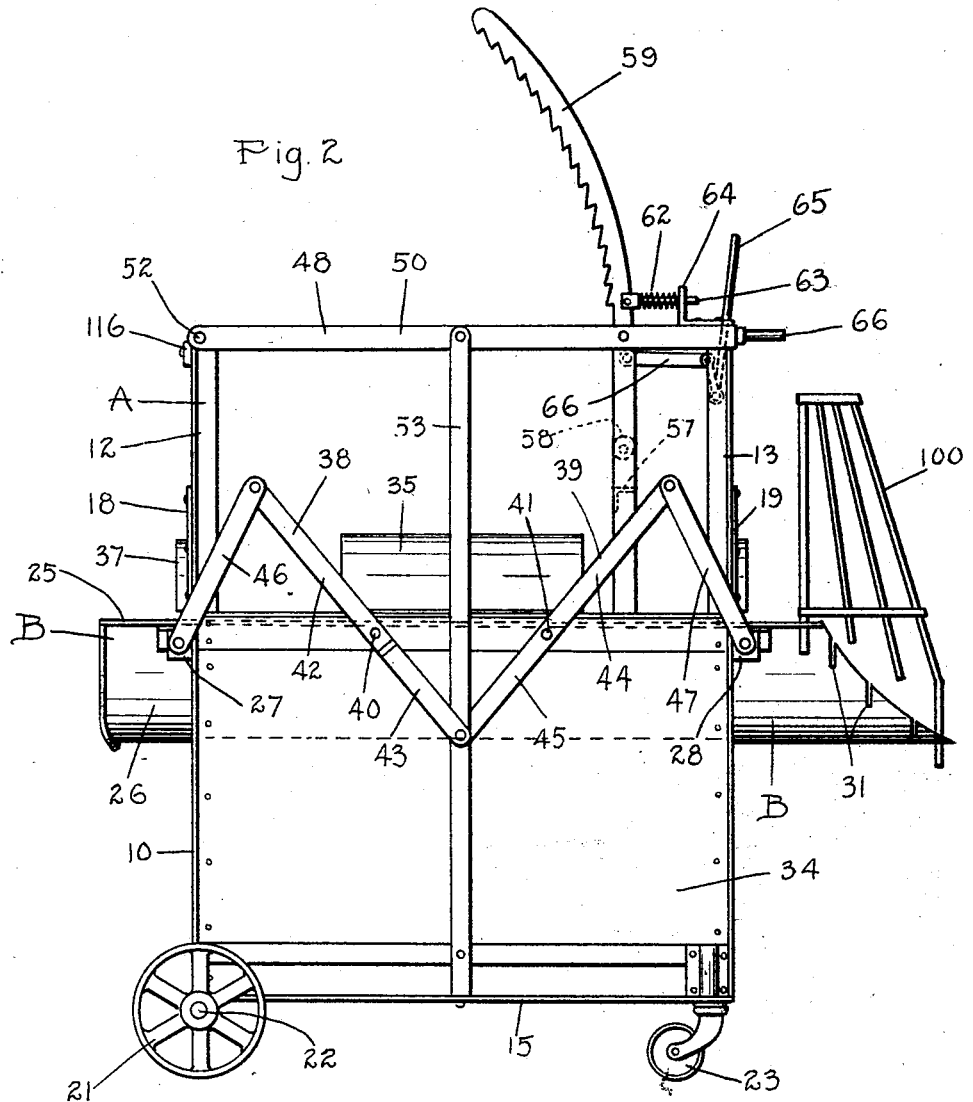
Fig. 2 is a side elevational view of our invention illustrating the cradle in its fully raised position.

For operating the levers 38 and 39 we employ a yoked lever 48 having two legs 49 and 50 connected by a bridge member 51. The legs 49 and 50 are pivoted to a bar 52 secured to the cross rail 116, which bar and the bridge member 51 are of such a length as to bring the legs 49 and 50 outwardly beyond the rails 14 of the frame members 10 and 11 in substantially the plane of the levers 38 and 39. Intermediate the ends of each of said legs 49 and 50, the same have pivoted to them two depending links 53 and 54 which are pivoted to the ends of the arms 43 and 45 as best shown in Fig. 1. It will be noted that the links 53 and 54 are disposed one on each side of the leg 50 and that the arm 43 is offset as indicated at 55, to allow the free movement of said legs and levers without interference. When the yoke 48 is lowered from the position shown in Fig. 1 to that shown in Fig. 2 the levers 38 and 39 are swung upon the pivots 40 and 41 to take the position shown in Fig. 2, thereby elevating the cradle B from its lowermost to its uppermost position.

For holding the lever mechanism of the invention in locked position, the following construction is employed: Attached to the rails 14 and 16 of each of the frame members 10 and 11 is a strut 56 which carries a cross member 57 rigidly secured thereto. Upon this cross member is mounted a bracket 58 which has pivoted to it a swinging quadrant 59 formed with a plurality of teeth 60 arranged along the arcuate edge thereof. This quadrant is constructed in the arc of a circle having its center in proximity to the axis of the yoke 48, but being so disposed as to normally bring the upper end of quadrant 59 closer to the axis of yoke 48 than the lower end. This quadrant is adapted to engage a latch bar 61 extending across and secured to the legs 49 and 50 of said yoke. Said quadrant is normally held in engagement with the latch bar 61 by means of a compression coil spring 62, which is mounted upon a pin 63 pivoted to the said quadrant and slidable along a support 64 attached to the tie bar 117.

The quadrant 59 is operated through a bell crank 65 mounted on frame A, which bell crank is connected by means of a link 66 to said quadrant. Upon swinging the bell crank 65, said quadrant is caused to move in opposition to the spring 62 away from the latch bar 61 so as to allow the yoke 48 to be released. It is to be noted that the selection of the center of the circle of which the quadrant 59 is an arc is such that upon releasing the latch bar 61 from any of the teeth 59, the said latch bar engages the next tooth thereby permitting of lowering the device, tooth by tooth, without danger of the cradle accidentally dropping to the bottom at one time.

The operation of the device is as follows: The yoke 51 is first moved to its upper position as shown in Fig. 1, which causes the cradle B to be lowered to its lowermost position. The animal is then driven into the crate through the space between the frame members 10 and 11, the abutment 35 and cradle B. Upon entering the crate the legs of the animal protrude through the openings 29 and 30 in said crate, the animal still standing on the floor in the usual manner. A guard 100 detachably mounted upon the forward end of cradle B prevents the animal from running through the crate. When the animal is in proper position in the crate, the cradle B is raised by moving the yoke 48 downwardly until the back of the animal is tightly wedged against the abutment 35. This is accomplished by applying a long handle not shown in the drawings, to a stud 66 issuing outwardly from the bridge member 51 of yoke 48 and pulling down upon said handle. After the animal is tightly wedged between the abutment 25 and the cradle B, the same being held in place through the quadrant 59, the handle and the guard 100 may be removed. The chain 101 is looped about the head of the animal and the ends thereof which pass through the slot 33 are drawn tight along the underside of the cradle B and are let into any of the kerfs 31 to hold the said chain firmly applied to the animal's head. After this the crate may be wheeled about to permit of operating upon the animal as desired.

Our invention is highly advantageous in that it provides a simple and effective device for quickly and effectively holding an animal while being operated upon. The raising and lowering is accomplished by a single movement so that the animal can be securely held while in the proper position without giving it an opportunity to extricate itself. All danger from the manipulation of the invention is eliminated so that the operator may safely and effectively use the device.

Changes in the specific form of our invention, as herein disclosed, may be made within the scope of what is claimed without departing from the spirit of our invention.

Having described our invention, what we claim as new and desire to protect by Letters Patent is:

1. An animal holding crate comprising spaced upright frame members, an abutment attached to and extending across the upper portions of said frame members, a cradle positioned between said frame members and below said abutment and raisable toward said abutment, brackets issuing outwardly from said cradle near the corners thereof, a pair of levers pivoted to each of said frame members having arms extending toward said brackets, hangers connecting each of said levers with one of said brackets, a yoke pivoted to both of said frame members having a leg arranged substantially in the plane of said levers, a pair of links connected to each leg of said yoke and to said levers, said yoke upon movement being adapted to simultaneously operate all of said levers for raising said cradle at all four corners thereof, and means for holding said cradle from movement.

2. An animal holding crate comprising a pair of spaced frame members, each frame member comprising a pair of uprights connected by an upper, lower and an intermediate rail, tie members connecting said frame members together near the upper portions thereof, an abutment extending across and secured to the intermediate rails of said frame members, a cradle positioned between said frame members and movable toward and away from said abutment, a pair of levers pivoted to each of said intermediate rails having their pivots spaced and symmetrically disposed relative to the centers of said intermediate rails, said levers being formed with outwardly and inwardly extending arms, brackets formed on said cradle at the four corners thereof in proximity to the uprights of said frame members, hangers connecting the outwardly extending arms of said levers with said brackets, a yoke pivoted to the upper portion of one of the uprights of each of said frame members, said yoke having a leg positioned substantially in the plane of said levers, a pair of links pivoted to each leg of said yoke and connected to the inwardly extending arms of said levers, whereby all of said levers are simultaneously operated to raise and lower said cradle from all four corners thereof, and means for holding said cradle from movement.

3. An animal holding crate comprising a framework, an abutment attached to said framework, a cradle carried by said framework and movable toward said abutment, said cradle being formed with a slot along the central portion thereof and having kerfs along its edges, and a chain adapted to be looped about the neck of the animal supported upon said cradle and passing through said slot, the ends of said chain being adapted to be hooked into said kerfs for holding the same attached to the neck of the animal.

In testimony whereof, we have signed our names to this specification.

MICHAEL J. MARRINAN.
MARTIN J. MARRINAN.
JAMES W. MARRINAN.